Jan. 7, 1936.  D. B. KNIGHT  2,027,106
ABSORPTION REFRIGERATING APPARATUS
Filed June 20, 1932
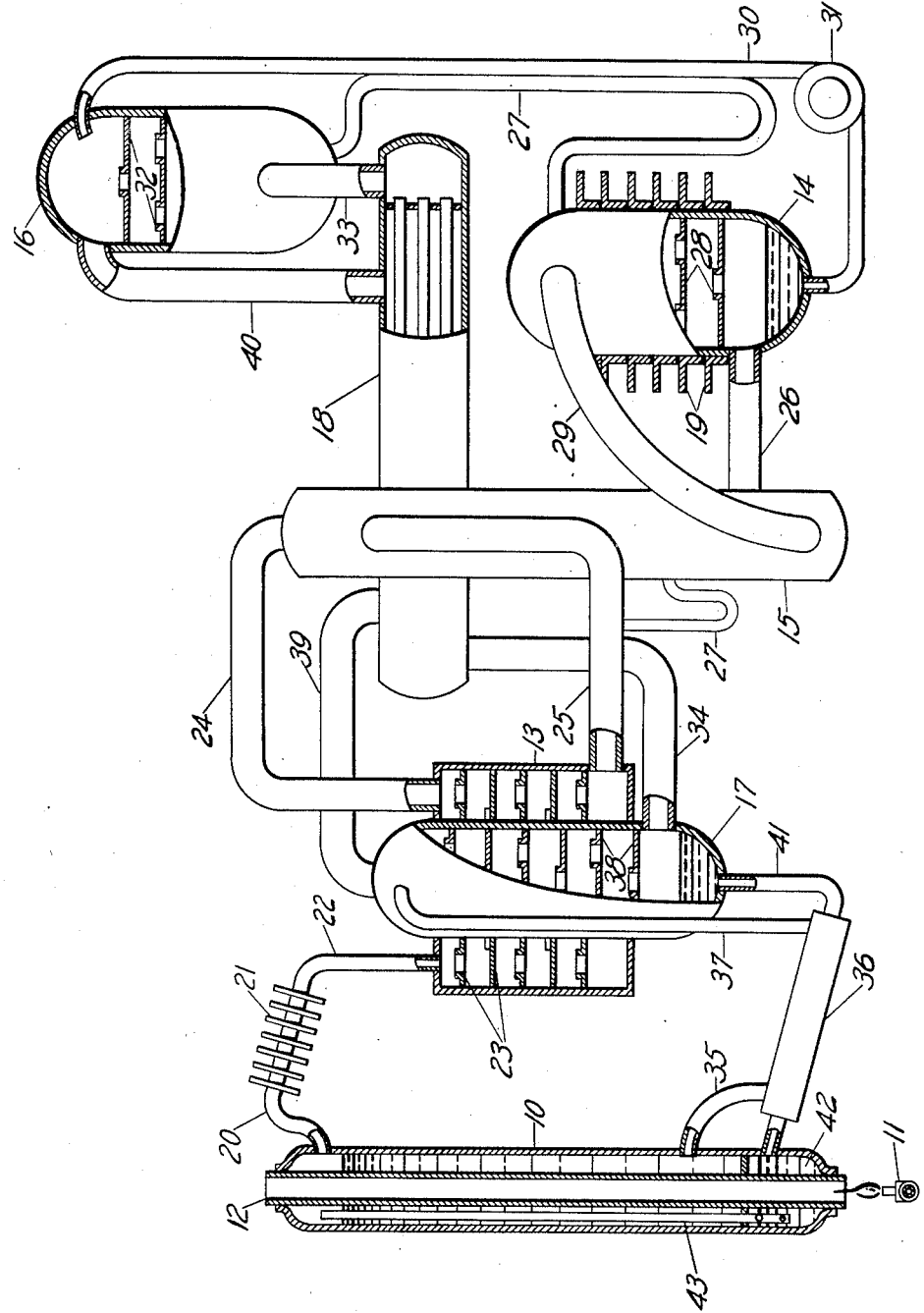
INVENTOR.
DONALD B. KNIGHT
BY
ATTORNEY.

Patented Jan. 7, 1936

2,027,106

UNITED STATES PATENT OFFICE 2,027,106

ABSORPTION REFRIGERATING APPARATUS

Donald Branch Knight, Brooklyn, N. Y., assignor, by mesne assignments, to Servel, Inc., Dover, Del., a corporation of Delaware Application June 20, 1932, Serial No. 618,102

16 Claims. (Cl. 62—119.5)

This invention relates to refrigeration, and more particularly to refrigerating systems of the absorption type.

In accordance with this invention, there is provided a system in which evaporation and absorption take place in several stages, wherefore the temperature difference between the evaporator and absorber of each stage is much less than in a system in which the same refrigerating temperature is obtained by single stage evaporation and absorption.

Other objects and advantages will be apparent from the following description taken in connection with the accompanying drawing, in which the figure shows schematically, with parts in vertical section, an absorption refrigerating system of the pressure equalized type in which circulates an inert gas contemplated by this invention.

For purposes of this description, ammonia may be used as the cooling fluid, water as the absorption liquid, and hydrogen as an inert pressure equalizing medium. Referring to the drawing, a generator 10 adapted to contain a solution of ammonia in water is heated by a burner 11 in a flue 12 which extends vertically through the generator. The first stage evaporator 13 and an absorber 14 are interconnected through a gas heat exchanger 15 for the circulation of gas therebetween, as well known in the art. A second stage evaporator 16 and the absorber 17 are interconnected through a gas heat exchanger 18 for the circulation of gas therebetween in a similar manner. The first stage evaporator 13 is located in heat exchange relation with the second stage absorber 17, for instance as shown, by arranging the evaporator as a jacket around the absorber. The first stage absorber 14 is provided with heat radiating fins 19 to aid in the radiation of the heat of absorption.

Ammonia gas expelled from solution by heat in the generator 10 passes through conduit 20 to a condenser 21, which may be air cooled as indicated in the drawing. From the condenser, liquid ammonia flows through conduit 22 to the first stage evaporator 13 where it flows downwardly over baffle plates 23, evaporating into the weak gas which enters the top of the evaporator through conduit 24. The resulting rich gas mixture flows from the lower part of the evaporator 13 through conduit 25, gas heat exchanger 15, and conduit 26, into the absorber 14. A drain conduit 27 is provided to conduct unevaporated liquid from the evaporator 13 to the absorber 14, via the gas heat exchanger 15. As hereinafter described, weak absorption liquid from the evaporator 16 drains through conduit 27 into the upper part of absorber 14 where it flows downwardly over baffle plates 28, absorbing ammonia out of the rich gas mixture. The weak gas flows from the upper part of absorber 14 through conduit 29, gas heat exchanger 15 and conduit 24, back to the evaporator 13.

Enriched absorption liquid, that is a water solution of high ammonia concentration, accumulates in the lower part of absorber 14 from where it is raised through conduit 30 into the upper part of the evaporator 16 by means of a liquid lifting device illustrated by a pump 31. Although I have shown a mechanical pump 31, it is obvious that liquid may be raised through conduit 30 by any well-known means such as vapor pressure lifts, siphons, and the like. The flow of liquid through conduit 30 to the evaporator 16 may be controlled in any manner known in the art, as for instance, by a float responsive to the liquid level in absorber 14. Conduits 27 and 30 are arranged as indicated in the drawing for heat exchange between the weak liquor from evaporator 16 and strong liquor from the absorber 14.

In the evaporator 16, the concentrated solution flows downwardly over baffle plates 32 and the ammonia evaporates out of solution by diffusion into the inert gas, hydrogen. The resulting gas mixture, which is heavier than the hydrogen, flows from the lower part of the evaporator 16 through conduit 33, gas heat exchanger 18 and conduit 34 to the second stage absorber 17, while the weakened absorption liquid drains back to the absorber 14 through conduit 27.

Weak absorption liquid from which ammonia has been expelled in the generator 10 overflows through conduit 35, liquid heat exchanger 36, and conduit 37 into the upper part of the second stage absorber 17, where it flows downwardly over baffle plates 38, absorbing ammonia out of the gas mixture from the evaporator 16. The weak gas returns through conduit 39, gas heat exchanger 18, and conduit 40 to the upper part of the evaporator 16. Enriched absorption liquid accumulates in the lower part of the absorber 17 from where it flows in conduit 41 through the liquid heat exchanger 36 to a heated chamber 42, from where it is raised through conduit 43 back into the generator 10 by thermosiphonic action as well known in the art.

It will be obvious to those skilled in the art that various other changes may be made in the construction and arrangement without departing from the spirit of the invention and therefore the invention is not limited to what is shown in the drawing and described in the specification, but only as indicated in the following claims.

I claim:

1. A refrigerating system including a first fluid circuit comprising a first evaporator and a first absorber interconnected for the circulation of gas therebetween, a second fluid circuit comprising a second evaporator and a second absorber also interconnected for the circulation of gas therebetween, said second absorber and said first evaporator being in heat exchange relation, a generator adapted to contain a solution of a refrigerant in an absorption liquid, a condenser connected to receive refrigerant vapor from said generator and discharge liquid into first said evaporator, means for circulating weak absorption liquid from said generator through said second absorber, and means for circulating absorption liquid through and between said second evaporator and said first absorber.

2. A refrigerating system including a generator, an absorber, means for circulating absorption liquid from said generator through said absorber, an evaporator arranged in heat exchange relation with said absorber, a condenser connected to receive vapor from said generator and discharge liquid into said evaporator, a second absorber, means interconnecting said evaporator and said second absorber for the circulation of an inert gas therebetween, a second evaporator, means interconnecting said second evaporator and said first absorber for the circulation of an inert gas therebetween, and means for circulating absorption liquid between and through said second evaporator and said second absorber.

3. A refrigerating system including a generator, an absorber, means for circulating absorption liquid from said generator through said absorber, an evaporator arranged to cool said absorber, an air-cooled condenser connected to receive vapor from said generator and to discharge liquid into said evaporator, a second evaporator, means including a gas heat exchanger interconnecting said second evaporator and said absorber for the circulation of an inert gas therebetween, a second absorber having heat radiating fins, means including a gas heat exchanger interconnecting said second absorber and said first evaporator for the circulation of an inert gas therebetween, and means for circulating absorption liquid between and through said second evaporator and said second absorber.

4. A refrigerating system including a generator, an absorber, an evaporator arranged in heat exchange relation to said absorber, a second absorber, a second evaporator, a condenser connected to receive vapor from said generator and discharge liquid to first said evaporator, a circuit for absorption liquid between and through said generator and said first absorber, a circuit for gas between and through said first absorber and said second evaporator, a second circuit for gas between and through said first evaporator and said second absorber, and a circuit for absorption liquid between and through said second evaporator and second absorber.

5. A refrigerating system including a first absorption liquid circuit, a second absorption liquid circuit, each having a vaporizing portion and an absorbing portion, a first circuit for inert gas including the absorbing portion of said first liquid circuit and the vaporizing portion of said second liquid circuit, a second gas circuit including the absorbing portion of said second liquid circuit and having a portion in heat exchange relation with the absorbing portion of said first liquid circuit, and condensing means connected to receive cooling fluid vapor from said first liquid circuit and discharge liquid cooling fluid into the last said portion of said second gas circuit.

6. A refrigerating system including a first gas circuit, a second gas circuit, each having a portion in heat exchange relation with the other, means for circulating absorption liquid through and between other portions of said gas circuits, means for circulating absorption liquid through said heat exchange portion of the first gas circuit, means for expelling cooling fluid vapor from solution in last said quantity of absorption liquid, and means for condensing said vapor and discharging the liquid into said heat exchange portion of said second gas circuit.

7. The method of refrigerating which comprises evaporating a cooling fluid out of solution in an absorption liquid into an inert gas, absorbing the cooling fluid out of the resulting gas mixture into a separate quantity of absorption liquid, expelling cooling fluid vapor from the resulting solution, condensing the vapor to liquid, evaporating the liquid into another quantity of inert gas by transfer of heat produced by said absorption, and absorbing the vapor out of the resulting gas mixture into the absorption liquid from which cooling fluid was previously evaporated.

8. The method of refrigerating which comprises circulating inert gas in two separate circuits, evaporating cooling fluid out of solution in an absorption liquid into the gas in the first of said circuits, absorbing cooling fluid out of the resulting gas mixture, utilizing the heat of absorption to evaporate cooling fluid into the gas in the second of said circuits, and absorbing cooling fluid vapor out of the gas in said second circuit into the absorption liquid from which cooling fluid was evaporated in said first circuit.

9. The method of refrigerating which comprises separately circulating two quantities of absorption liquid containing dissolved cooling fluid through evaporating-absorbing cycles, circulating an inert gas in contact with one quantity of absorption liquid during the evaporating portion of its cycle and the second quantity of absorption liquid during the absorbing portion of its cycle, condensing to liquid vapor from said second quantity of absorption liquid, evaporating the liquid into a second quantity of inert gas by transfer of heat produced in the absorbing portion of the cycle of said second quantity of absorption liquid, and passing the resulting gas mixture in contact with the first said quantity of absorption liquid during the absorbing portion of its cycle.

10. The method of refrigerating which comprises circulating a first quantity of absorption liquid containing dissolved cooling fluid through an evaporating-absorbing cycle, circulating a second quantity of absorption liquid containing dissolved cooling fluid through a vaporizing-absorbing cycle, circulating an inert gas in contact with said first quantity of absorption liquid during the evaporating portion of its cycle and said second quantity of liquid during the absorbing portion of its cycle, condensing to liquid fluid vaporized from solution in said second quantity of absorption liquid, utilizing heat of absorption to evaporate the liquid fluid into a second quantity of inert gas and circulating the resulting gas mixture in contact with said first quantity of absorption liquid during the absorbing portion of its cycle.

11. The method of refrigeration which comprises circulating inert gas in two separate circuits, circulating an absorption liquid directly between and through a portion of each of said gas circuits, and transferring cooling fluid through an absorption-generation-condensation-evaporation cycle between other portions of said gas circuits, the absorption and evaporation portions of said cycle being in thermal exchange relation.

12. A refrigeration system including an evaporator, an absorber interconnected with said evaporator for circulation of absorption liquid directly therebetween, a first circuit for inert gas including said evaporator, a second circuit for inert gas including said absorber, and means including a second absorber in said first gas circuit, a generator, a condenser, and a second evaporator in said second gas circuit and in thermal exchange relation with said second absorber for transferring cooling fluid vapor from the gas in said first circuit into the gas in said second circuit.

13. A refrigeration system including an evaporator, an absorber interconnected with said evaporator for circulation of absorption liquid directly therebetween, a first circuit for inert gas including said evaporator, a second circuit for inert gas including said absorber, and means including a second absorber in said first gas circuit, a generator, a condenser, and a second evaporator in said second gas circuit for transferring cooling fluid vapor from the gas in said first circuit into the gas in said second circuit, said second absorber and second evaporator being in thermal exchange relation.

14. A refrigerating system including an absorption liquid circuit having a vaporizing portion and an absorbing portion, a circuit for inert gas including said vaporizing portion, a second circuit for inert gas including said absorbing portion, and means independent of said liquid circuit for removing cooling fluid vapor from the inert gas in said first circuit and introducing the vapor into the gas in said second circuit, said means including an absorber, generator, condenser, and evaporator, and of which said absorber and evaporator are in thermal exchange relation.

15. A refrigerating system including an evaporator, an absorber interconnected with said evaporator for circulation of absorption liquid directly therebetween, a first inert gas circuit including said evaporator, a second inert gas circuit including said absorber, and means including a second absorber, a generator, a condenser, and a second evaporator for transferring cooling fluid vapor from the gas in said first circuit into the gas in said second circuit, said second evaporator being constructed and arranged to cool said second absorber.

16. A refrigerating system including a first circuit for inert gas, a second circuit for inert gas, means for circulating absorption liquid directly between and through a portion of each of said gas circuits, and means including an absorber, generator, condenser and evaporator for transferring cooling fluid vapor between other portions of said gas circuits, said absorber and evaporator being in thermal exchange relation.

DONALD BRANCH KNIGHT.